Oct. 22, 1968  R. M. MARTIN ET AL  3,406,614
TUBULAR MEMBER AND METHOD FOR MAKING THE SAME
AND CONTAINER MADE THEREFROM
Original Filed June 9, 1965  2 Sheets-Sheet 1

INVENTORS
ROY M. MARTIN
CALVIN L. WILSON

BY Glenn, Palmer & Lyne
ATTORNEYS

Oct. 22, 1968  R. M. MARTIN ET AL  3,406,614
TUBULAR MEMBER AND METHOD FOR MAKING THE SAME
AND CONTAINER MADE THEREFROM
Original Filed June 9, 1965  2 Sheets-Sheet 2
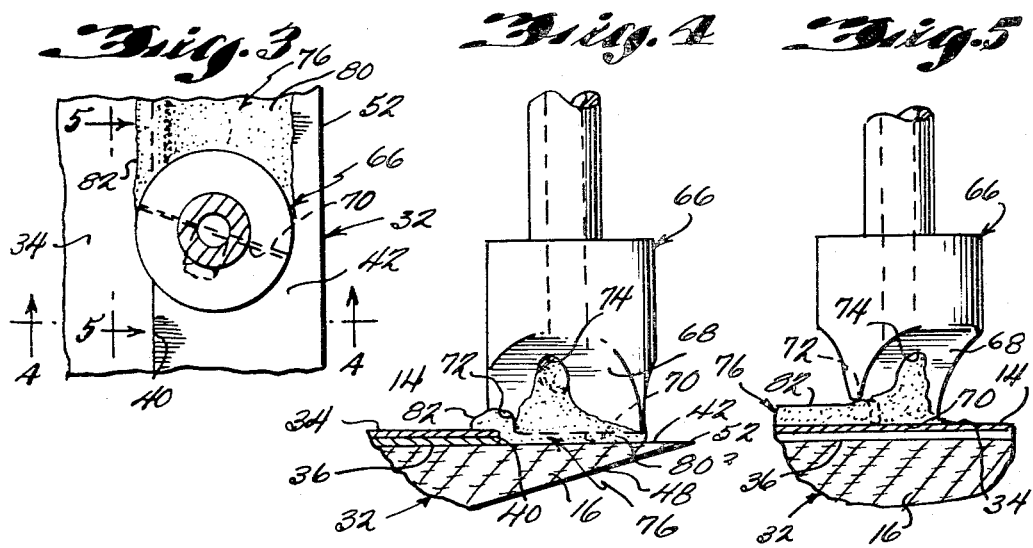
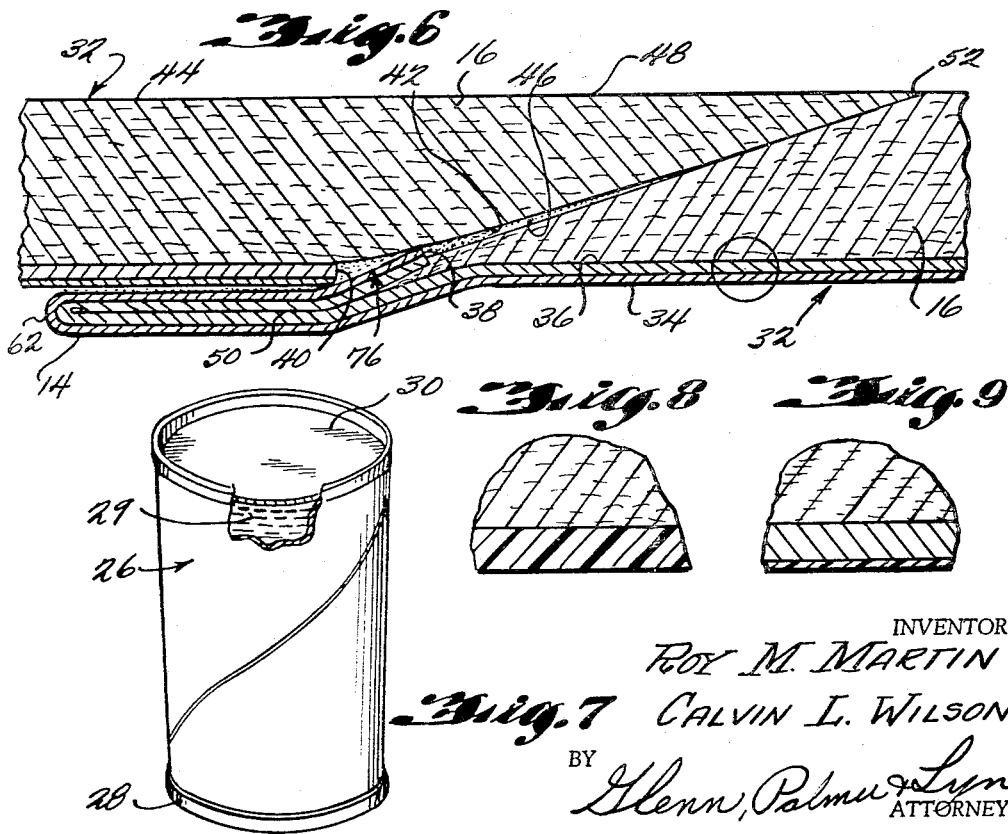
INVENTORS
ROY M. MARTIN
CALVIN L. WILSON
BY Glenn, Palmer & Lyne
ATTORNEYS United States Patent Office 3,406,614
Patented Oct. 22, 1968

3,406,614
TUBULAR MEMBER AND METHOD FOR MAKING THE SAME AND CONTAINER MADE THEREFROM
Roy M. Martin, Henrico County, and Calvin L. Wilson, Chesterfield County, Va., assignors to Reynolds Metal Company, Richmond, Va., a corporation of Delaware
Original application June 9, 1965, Ser. No. 462,666, now Patent No. 3,315,864, dated Apr. 25, 1967. Divided and this application Mar. 13, 1967, Ser. No. 643,756
8 Claims. (Cl. 93—80)

ABSTRACT OF THE DISCLOSURE

Apparatus and method are disclosed for the production of fiber-foil tubular containers, having a liquid tight liner on the interior of a single body ply. The mating helical edges of the body ply are skived and, when bonded by suitable adhesive, provide a joint stronger than the web itself. In forming the web, one edge of the liner ply or strip overlaps the adjacent skived edge of the body strip and is folded back upon itself. The opposite edge of the liner is separated away from the opposite skived edge of the body ply. When successive loops of the web are pressed together with adhesive therebetween an acceptable metal to metal seal is formed, the edges of which do not extend substantially between the mating edges of the body ply, thereby effecting economy of the liner materials. In the method of forming the tubular member of the container, a novel step of applying the adhesive is employed, whereby a portion of the adhesive is formed as a bead over an edge of the metallic liner material and a second adhesive portion, integral with the bead, is doctored into a thin film over an adjacent skived surface of the body ply, thus providing improved characteristics in the bonding of the metal and fiber surfaces.

---

This application is a division of application Ser. No. 462,666, filed June 9, 1965, now Patent No. 3,315,864, issued Apr. 25, 1967.

This invention relates to improved helically wound tubular members and containers and packages made therefrom and to improved methods and apparatus for making such tubular members.

The present invention constitutes an improvement of commonly-assigned application Ser. No. 275,146, filed Apr. 23, 1963. In that application there are described certain prior art practices for making composite container bodies and a new construction and method of making the same wherein capillary action at the end closures of such composite containers is substantially eliminated so that the containers are readily adapted to package moisture-bearing products and the like.

It is an object of the present invention to provide a helically wound tubular member having an improved helical joint between the strip of liner material and the strip of body material which obtains all of the advantages of the tubular member disclosed in the aforesaid application and provides for the effective elimination of moisture seepage throughout the life of the container without the necessity of providing two overlapping plies of strip material in the body of the container.

Another object of the present invention is the provision of a method of making a tubular member or the like including improved procedures for forming the helical joint between adjacent convolutes of the liner and body material.

Still another object of the present invention is the provision of an apparatus for making a tubular member of the type described including improved means for depositing a band of liquid material, such as hot melt or the like, to a composite liner and body strip of material during the formation of the helical joint of the tubular member.

These and other objects of the present invention will become more apparent during the course of the following detailed description and appended claims.

The invention may best be understood with reference to the drawings, wherein an illustrative embodiment is shown.

In the drawings:

FIGURE 3 is an enlarged fragmentary sectional view taken along the line 3—3 of FIGURE 1;

FIGURE 4 is a sectional view taken along the line 4—4 of FIGURE 3;

FIGURE 5 is a sectional view taken along the line 5—5 of FIGURE 3;

FIGURE 6 is an enlarged fragmentary sectional view taken along the line 6—6 of FIGURE 1;

FIGURE 7 is a perspective view of a container package embodying the principles of the present invention, with parts broken away for purposes of clearer illustration;

FIGURE 8 is an enlarged, fragmentary sectional view of a portion of the container wall indicated by the circle in FIGURE 6 showing a modified form of liner material; and FIGURE 9 is a view similar to FIGURE 8 showing a still further modified form of liner material.

Figure 1:
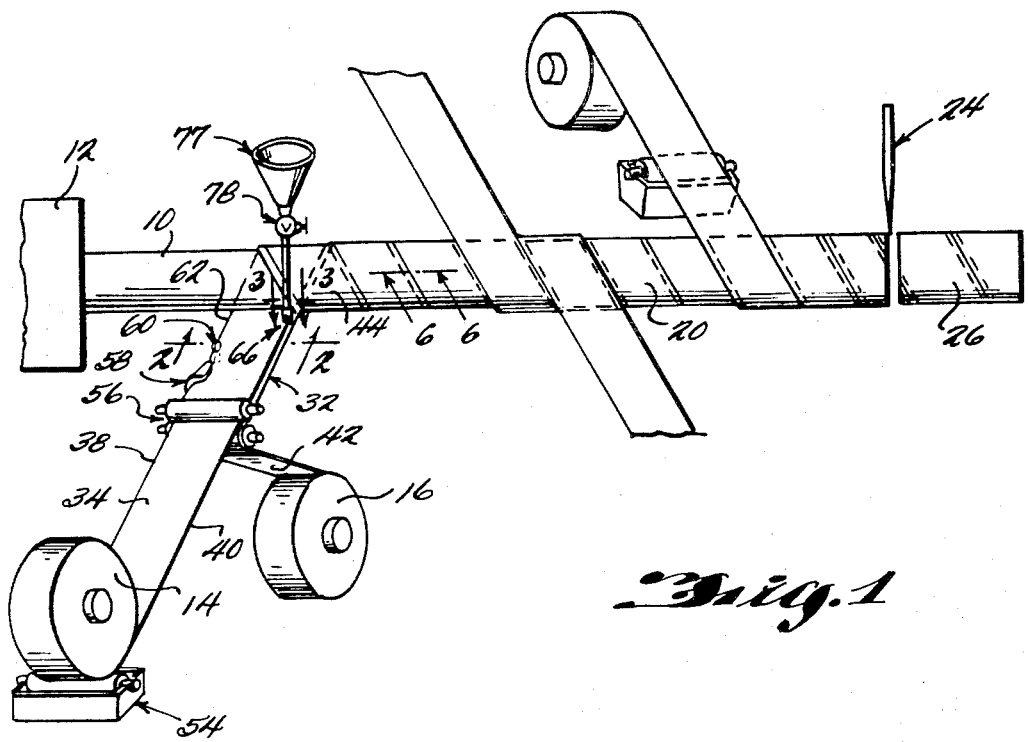
FIGURE 1 is a schematic view illustrating the method and apparatus of the present invention for making the improved tubular member of the present invention.

Referring now more particularly to FIGURE 1, there is shown therein schematically apparatus for making a tubular member in accordance with the principles of the present invention. In general, the apparatus is constructed of conventional components, except as hereinafter set forth, and includes the usual cylindrical forming mandrel 10 fixedly mounted in cantilevered fashion to a supporting means 12 adapted to have liner, body and label strips of material 14, 16 and 18 respectively, helically wound thereon to continually produce container body stock 20 that is continuously rotated and axially advanced to the right on the mandrel 10, as by an endless belt mechanism 22 of the conventional construction. The apparatus also includes the conventional cutting mechanism, generally indicated schematically at 24, which is operable to cut the body stock 20 advancing from the mandrel 10 into individual tubular members 26.

Also in accordance with conventional practice, the individual tubular members 26 are subsequently fed to conventional equipment where the ends are flanged and a bottom closure cap 28 (see FIGURE 7) is secured to one end of the tubular member to form an open top container. The open top container is then filled with a desired material 29 (see FIGURE 7) preferably liquid, as, for example, oil, citrus juices and the like, and sealed therein by engagement of a top closure cap 30 (see FIGURE 7) on the open top of the container, the latter all in conventional fashion.

Figure 2:
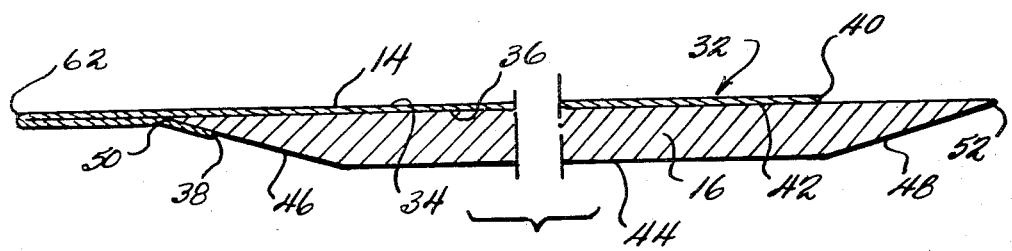
FIGURE 2 is an enlarged sectional view taken along the line 2—2 of FIGURE 1.

The above-described apparatus and method of forming individual tubular members and utilizing such individual tubular members as a part of a material package is generally described in the aforesaid copending application. The improvement of the present invention is directed more particularly to the formation of an improved composite web of liner and body material 32 and the helical winding of the same on the mandrel to form an improved helical joint in the container body stock. As best shown in FIGURES 1 and 2, the composite web of liner and body material 32 is formed from the strip of liner material 14 and the strip of body material 16, each of which, as shown, is supplied in the form of a roll in accordance with conventional practice.

As best shown in FIGURE 2, the strip of liner material 14 includes a pair of opposed sides 34 and 36 and opposed ends 38 and 40. The strip of body material 16 includes opposed sides 42 and 44 and skived marginal end portions 46 and 48 terminating in end edges 50 and 52. The skived marginal end portions are formed in any conventional fashion, each marginal end portion being beveled or tapered from the side 44 to the side 42, the taper terminating in a thin end edge 50 and 52. Preferably, the marginal edge portion 46 has a taper somewhat wider than the taper of the marginal edge portion 48. For example, in a preferred embodiment the width of the marginal end portion 46 may be ¼ inch, whereas the marginal end portion 48 is 3/16 inch.

In forming the composite web material 32, the strip of liner material 14 is laminated to the strip of body material 16 with the sides 36 and 42 respectively in abutting engagement, with the end edge 38 of the liner strip spaced outwardly from the adjacent end edge 50 of the body strip and with the end edge 40 of the liner strip disposed inwardly of the end edge 52 of the body strip.

As best shown in FIGURE 1, the lamination of the liner and body strips is accomplished by any suitable means as, for example, an adhesive roller device 54 positioned to apply suitable adhesive to the side 36 of the liner strip between the supply roll thereof and a pair of nip rollers 56 which serve to move the adhesive applied side 36 of the liner strip into engagement with the side 42 of the body strip.

After the two strips have passed through the nip rollers 56, the end edge 38 of the liner strip which is disposed outwardly of the associated end edge 50 of the body strip is engaged by a suitable folding device, such as a plow 58, which is constructed and arranged to fold the end edge 38 against the skived marginal end portion 46 of the body strip at a position adjacent the associated end edge 50 but spaced slightly inwardly therefrom. The folding plow is adapted to form a spaced loop which is subsequently formed, as by cooperating rollers 60, with a fold 62 which is spaced from the adjacent end edge 50 of the body material.

The present apparatus also includes a novel mechanism for applying a band 76 of sealer material, preferably in the form of a hot melt of conventional formulation, on the web at a position along the end edge 40 of the liner strip. As shown, the band applying mechanism includes a nozzle, generally indicated at 66, having its lower end portion formed with a rearward inclined surface 68 terminating in a horizontal edge 70, having a notch 72 formed adjacent one end thereof. The nozzle 66 includes an outlet opening 74 communicating with the central portion of the inclined surface 68 at a position above the edge surface 70. The outlet opening is connected to a source of hot melt material, schematically illustrated at 77 in FIGURE 1, from which a continuous supply of hot melt material is fed through the outlet opening 74, as by a metering valve or the like, schematically illustrated at 78 in FIGURE 1.

As best shown in FIGURES 1 and 3–5, the web 32 is fed to the mandrel 10 with the side 34 of the liner strip 14 facing upwardly. The nozzle 66 is disposed above the web of material at a position closely adjacent the mandrel with the notch 72 above the end edge 40 and the edge surface 70 extending outwardly and in a direction opposed to the direction of movement of the web, as best shown in FIGURE 3, toward the end edge 52 of the body strip 16. In this way, as the web 32 moves beneath the nozzle 66, the edge surface 70 serves to doctor the hot melt material issuing from the outlet 74 into a film formation 80 onto the side 42 of the marginal end portion 48 of the body strip. The notch 72 serves to interrupt the doctoring surface 70 so that the band of hot melt material applied to the web 32 includes an integral bead formation 82 overlying the end edge 40 which is integral with the film formation 80 overlying the side 42 of the end portion 48 of the body strip.

The application of the band of hot melt material 76 in the position and formation described above is preferred and provides an optimum sealing characteristic. First, by applying the band of hot melt material to the moving web 32 just prior to the movement of the web in helical formation onto the mandrel, it minimizes the exposure of the hot melt material to atmospheric conditions between the point of application and the point when the hot melt material must perform its sealing function. Second, the formation of the band of hot melt material with integral film and bead formations provides optimum heat transfer characteristics for the different materials which may be involved in the liner strip and body strip while at the same time insuring an effective seal between both types of material. For example, the liner strip preferably includes a metallic material which is capable of dissipating considerably more heat than paper material, and the band of hot melt material which engages the metallic portion is in a thicker bead formation as distinguished from the thinner film formation which engages the paper material. Moreover, the bead formation covers the end edge 40 tending to fill in any void which might be caused by the interior corner formed thereby in the joint. Moreover, the hot melt material in the bead formation will spread in a direction toward the fold 62 when the joint is formed. This insures a moisture-tight, liner-to-liner seal at the joint without the necessity of directly applying the hot melt material to the liner adjacent the fold. Such an operation, which is obviated by the present invention, requires production accuracy which is difficult to secure in actual operation. It will be noted that any spillage of hot melt material beyond the fold 62 would be deposited on the mandrel during operation, an undesirable occurrence which prevents the proper movement of the strips thereover.

It will be noted that the web 32 is fed to the mandrel 10 in helical formation so that the skived marginal end portion 46 of the body strip is disposed in lapped relation with the side 42 of the skived end portion 48 and the portion between the fold 62 and end edge 38 of the liner strip in lapped relation with a marginal portion of the liner strip adjacent the end edge 40. The joint thus formed, as shown in FIGURE 6, not only provides the necessary liner-to-liner seal on the interior surface of the tubular member formed but provides a joint which is smooth with respect to the overall body wall so as to insure a proper seal to the end closure caps 28 and 30. Additionally, the body strip-to-body strip seal, which is formed at the same time as the foil-to-foil seal with the application of a single band of hot melt material, provides the joint with a strength which is greater than the strength of the web itself. It has been found that structural failure of the tubular member will occur at a position other than the joint. Consequently, it is not essential, in accordance with the present invention, to provide an additional strip of body material over-lapping the joint thus formed.

While the present invention is not limited to a tubular member formed of one ply of body material, a one-ply tubular member made in accordance with the principles of the present invention has been shown in tests to perform with the same degree of satisfaction as a two-ply container formed in the conventional manner. The present invention thus provides economy in manufacture in the elimination of a ply of body material and the attendant costs in handling the same during manufacture.

The material which may be utilized for the liner strips, body strips and label strips in accordance with the principles of the present invention, are generally of a conventional nature. Since the tubular member of the present invention is particularly suited for packaging liquid material it is important that the interior surface of the tubular member be provided by a liquid impervious material. A preferred material in this regard is an aluminum containing foil, which, as shown in FIGURE 6, constitutes one ply of a laminate forming the liner strip, the other ply of the laminate being paper or the like. It will be understood that other types of lining material may be used such as a plain sheet of metallic foil, a sheet or film of plastic material as shown in FIGURE 8, plastic coated paper as shown in FIGURE 9, or other impervious material. The body material is preferably of paper stock while the label material is preferably of an aluminum laminate.

The thicknesses of the various strips are also in accordance with conventional practice. However, it should be understood that the present invention contemplates the formation of a tubular member from a single sheet of body material which may be generally of the same thickness as one sheet of a prior art type container utilizing two overlapping sheets of body material.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications etncompassed within the spirit and scope of the following claims.

What is claimed is:

1. A method of making a tubular member which comprises the steps of providing a first strip of material having opposed sides and opposed skived marginal end portions terminating in opposed end edges, providing a second strip of material having opposed end edges, disposing said second strip against one side of said first strip with one end edge of said second strip disposed outwardly of the adjacent end edge of said first strip and the opposite end edge of said second strip spaced inwardly from the adjacent end edge of said first strip a distance at least equal to the associated skived marginal end portion thereof to form a web of material, placing said one end edge of said second strip against the other side of the marginal end portion of said first strip in such a manner that said second strip forms a folded loop the fold of which is spaced from the adjacent end edge of said first strip, and helically winding said web of material in such a manner that the portion of said second strip between said fold and said one end edge and the adjacent skived marginal end portion of said first strip lap a portion adjacent said opposite end edge of said second strip and the associated marginal end portion of said first strip.

2. A method as defined in claim 1 including the step of applying a band of liquid adhesive material simultaneously to the portions of said first and second strips adjacent said opposite end edge of said second strip prior to helically winding said web of material.

3. A method as defined in claim 2, wherein said band of adhesive is applied with a bead formation overlying said opposite end edge of said second strip and an integral film formation extending toward the adjacent end edge of said first strip.

4. A method of making a tubular member which comprises the steps of providing a supply of a first strip of material having opposed sides and opposed skived marginal end portions terminating in opposed end edges, providing a supply of a second strip of material having opposed sides and opposed end edges, progressively moving one of the sides of said strips together with one end edge of said second strip disposed outwardly of the adjacent end edge of said first strip and the opposite end edge of said second strip spaced inwardly from the adjacent end edge of said first strip to form a moving web of material, progressively moving said one end edge of said second strip against the other side of the marginal end portion of said first strip during the movement of said strips together in such a manner that said second strip progressively forms a folded loop the fold of which is spaced from the adjacent end edge of said first strip, feeding a supply of liquid adhesive material downwardly onto the moving web of material with said opposite end edge of said second strip facing upwardly at a position along said opposite end edge of said second strip to progressively form a band of liquid material overlying the moving web of material along said opposite end edge of said second strip, and feeding said moving web in helical fashion about a cylindrical mandrel with the other side of said second strip in engagement with the surface of said mandrel in such a manner that the portion of said second strip between said fold and said one end edge and the adjacent skived marginal end portion of said first strip overlap a portion adjacent said opposite end edge of said second strip and the adjacent marginal end portion of said first strip, with said band of liquid material thereon.

5. A method of making a tubular member as defined in claim 4, including the step of doctoring the liquid material fed to said moving web along a line extending inwardly and in the direction of movement of said web which terminates in closely spaced relation to said opposite end edge of said second strip so as to progressively form the band of liquid material with a bead formation overlying said opposite end edge of said second strip and an integral film formation extending toward the adjacent end edge of said first strip.

6. Apparatus for making a tubular member from a first strip of material having opposed sides and opposed skived marginal end portions terminating in opposed end edges and a second strip of material having opposed end edges comprising means for disposing said second strip against one side of said first strip with one end edge of said second strip disposed outwardly of the adjacent end edge of said first strip and the opposite end edge of said second strip spaced inwardly from the adjacent end edge of said first strip a distance at least equal to the associated skived marginal end portion thereof to form a web of material, means for placing said one end edge of said second strip against the other side of the marginal end portion of said first strip in such a manner that said second strip forms a folded loop the fold of which is spaced from the adjacent end edge of said first strip, and means for helically winding said web of material in such a manner that the portion of said second strip between said fold and said one end edge and the adjacent skived marginal end portion of said first strip lap a portion adjacent said opposite end edge of said second strip and the associated marginal end portion of said first strip.

7. Apparatus for making a tubular container comprising means for retaining in roll formation a supply of a first strip of material having opposed sides and opposed skived marginal end portions terminating in opposed end edges, means for retaining in roll formation a supply of a second strip of material having opposed sides and opposed end edges, means for progressively moving one of the sides of said strips together with one end edge of said second strip disposed outwardly of the adjacent end edge of said first strip and the opposite end edge of said second strip spaced inwardly from the adjacent end edge of said first strip, means for progressively moving said one end edge of said second strip against the other side of the marginal end portion of said first strip with said strips together in such a manner that said second strip progressively forms a folded loop the fold of which is spaced from the adjacent end edge of said first strip, means for feeding a supply of liquid adhesive material downwardly onto the strips of material together with said opposite end edge of said second strip facing upwardly at a position along said opposite end edge of said second strip to progressively form a band of liquid material overlying said strips along said opposite end edge of said second strip, a cylindrical mandrel mounted in fixed cantilevered fashion, and means for feeding said strips together in helical fashion about the cylindrical surface of said mandrel with the other side of said second strip in engagement with the surface of said mandrel in such a manner that the portion of said second strip between said fold and said one end edge and the adjacent skived marginal end portion of said first strip overlaps a portion adjacent said opposite end edge of said second strip and the adjacent marginal end portion of said first strip with said band of liquid material thereon.

8. Apparatus as disclosed in claim 7 wherein said liquid material feeding means includes a nozzle having a rearward inclined surface terminating in a horizontal edge surface having a notch formed in one end thereof, said nozzle having an outlet opening communicating with the central portion of said inclined surface at a position above said horizontal edge, said horizontal edge extending inwardly and in the direction of movement of said strips of material together in closely spaced overlying relation to the adjacent end edge of said first strip with said notch overlying said opposite end edge of said second strip.

References Cited
UNITED STATES PATENTS

| | | | |
|---|---|---|---|
| 3,018,212 | 1/1962 | Chinn | 93—80 XR |
| 3,279,675 | 10/1966 | Elam et al. | 229—4.5 |
| 3,280,709 | 10/1966 | Elam | 93—94 |

BERNARD STICKNEY, *Primary Examiner.*